May 26, 1936.　　　I. FLORMAN　　　2,041,917

INSTANTANEOUS WATER HEATER

Filed Sept. 30, 1932

Inventor
IRVING FLORMAN
By
Attorney

Patented May 26, 1936

2,041,917

UNITED STATES PATENT OFFICE 2,041,917

INSTANTANEOUS WATER HEATER

Irving Florman, New York, N. Y.

Application September 30, 1932, Serial No. 635,676

9 Claims. (Cl. 219—39)

My invention relates to water heaters and refers more particularly to an electrically heated water heater than is attachable to a conventional faucet.

One object of my invention is to provide an instantaneous water heater that is simple of construction, cheap to manufacture and easily attached to any faucet.

Another object of my invention is to provide an instantaneous water heater with a strainer between the inlet and the heating chamber.

A further object of my invention is to provide an instantaneous water heater with a detachable strainer and a rubber washer for making a leak proof seal when attached to a conventional faucet.

A further object of my invention is to provide an instantaneous water heater with means for screwing to a conventional bibb and with set screws for holding the heater to a faucet.

I attain these objects by the means illustrated in the accompanying drawing, wherein like parts have similar numerals throughout the several views, in which.

Figure 1:
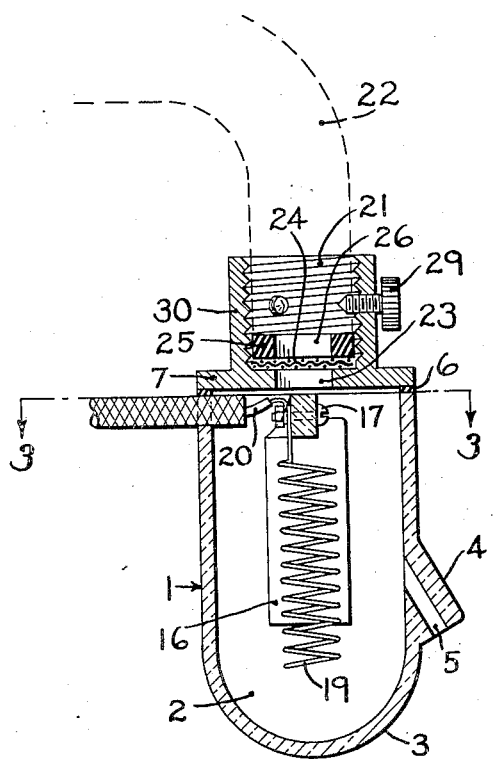
Fig. 1 is a section of the heater taken on lines 1—1 of Fig. 3.

The device is comprised of a body 1 of electrical and heat resisting material, formed to provide a heating chamber 2, said body preferably rounded at 3 and having a boss 4, provided with an angularly arranged hole 5, communicating with the heating chamber 2. A cap 7 is provided for closing the top of the heating chamber. In order to hold this cap 7, to prevent the water leaking, the bosses 8 and 9 are provided for carrying the holding bolts 10 and 11. A washer 6 is arranged beneath the cap.

Figure 2:
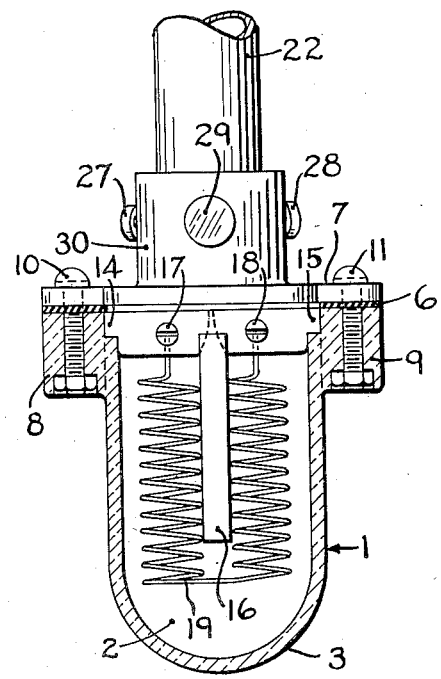
Fig. 2 is a partial section taken on lines 2—2 of Fig. 3.
Figure 3:
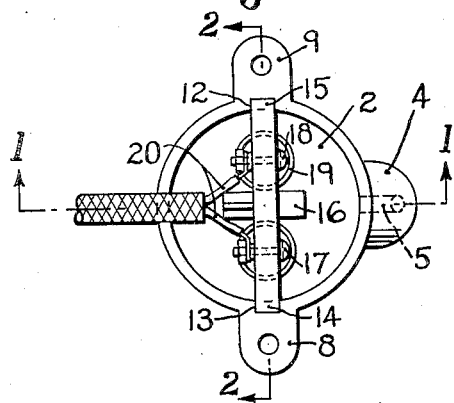
Fig. 3 is a plan taken on lines 3—3 of Fig. 1.
Figure 4:
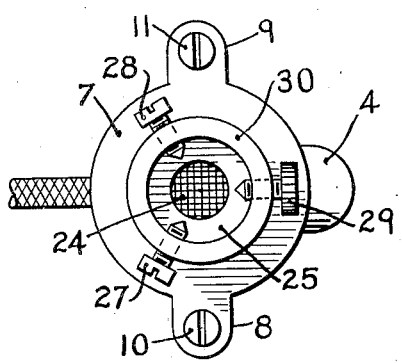
Fig. 4 is a plan of the device.

The interior of the body 1, has two notches 12 and 13, for slidably holding the notched ends 14 and 15, of the resistor support 16, preferably formed as illustrated in Figs. 1 and 2 and carrying the screws 17 and 18, that hold the ends of the resistor coil 19, and the two conduit leads 20, have their ends electrically attached to the said screws 17 and 18, and the other ends attached to a conventional electric plug, not shown.

The cap 7 is provided with an upstanding annular flange 30 which is threaded inside at 21 to fit a conventional faucet, and has a hole 23, providing a shoulder and means for holding the strainer, screen or filter 24, and in the inside of this threaded portion, and above the screen 24, the rubber washer 25, is arranged, said washer having a hole 26. The washer engages the end of a conventional faucet 22 for ensuring a tight fit.

In the event that it is not desirable to use the threads, the screws 27, 28 and 29 may be used to hold the device to a faucet, etc.

Having thus illustrated and described the preferred embodiment of my invention, I do not wish to limit myself to the exact construction or arrangement of parts shown, since it is evident that modifications may be made therein without departing from the spirit of the invention or scope of the claims.

I claim:

1. In an instantaneous water heater, an electrical and heat resisting flanged cup provided with an angularly arranged outlet, a flanged cap fixed to said cup, said cup carrying a water heating element therein, said flanged cap carrying a water filter, and means for attaching said cap to a conventional faucet.

2. In an instantaneous water heater, the combination of a flanged cup shaped heating chamber provided with an angularly arranged outlet, said heating chamber having notches therein positioning an electric resistor, and a flanged cap detachably held to said chamber and a filter within said cap.

3. In an instantaneous water heater, the combination of a flanged cup shaped heating chamber provided with an angularly arranged outlet, said heating chamber provided with inside oppositely arranged notches positioning an electric resistor therewithin and a flanged cap detachably held to said chamber holding said resistor support and carrying a filter, said cap having internal threads for attaching to a conventional faucet.

4. In an instantaneous water heater, the combination of a flanged cup shaped heating chamber provided with an angularly arranged outlet, said heating chamber notched to provide a support for positioning an electric resistor therewithin and a flanged cap detachably held to said chamber holding said resistor support and a multiple of screws for holding said device to a faucet.

5. In an instantaneous water heater, the combination of a flanged cup shaped heating chamber provided with an outlet, said heating chamber having notches therein positioning an electric resistor, a flanged cap detachably held to said chamber, and a filter within said cap.

6. In an instantaneous water heater, the combination of a cup shaped heating chamber provided with an outlet, said heating chamber having notches therein positioning an electric resistor, and a cap detachably held to said chamber.

7. In an instantaneous water heater, the combination of a flanged cup shaped heating chamber provided with an outlet, said heating chamber being notched to provide a support positioning an electric resistor therewithin, a flanged cap detachably held to said chamber holding said resistor support, and a multiple of screws holding said device to a faucet.

8. In an instantaneous water heater, the combination of a cup shaped heating chamber provided with an outlet, said heating chamber being notched to provide a support for positioning an electric resistor therewithin, and a flanged cap detachably held to said chamber holding said resistor support, said cap being internally threaded to engage a conventional bibb.

9. In an instantaneous water heater, the combination of a cup shaped heating chamber provided with an outlet, said heating chamber being notched to provide a support for positioning an electric resistor therewithin, a flanged cap detachably held to said chamber holding said resistor support, said cap being internally threaded to engage a conventional bibb, and a multiple of screws threadedly engaged in said cap for holding said device to a faucet.

IRVING FLORMAN.